United States Patent
Park et al.

(10) Patent No.: US 8,619,580 B2
(45) Date of Patent: Dec. 31, 2013

(54) METHOD AND APPARATUS FOR TRANSMITTING PACKET IN WIRELESS COMMUNICATION SYSTEM

(75) Inventors: Hyun-Gu Park, Seoul (KR); Sok-Kyu Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 343 days.

(21) Appl. No.: 12/969,551

(22) Filed: Dec. 15, 2010

(65) Prior Publication Data

US 2011/0141955 A1 Jun. 16, 2011

(30) Foreign Application Priority Data

Dec. 16, 2009 (KR) .................. 10-2009-0125490
Dec. 15, 2010 (KR) .................. 10-2010-0128264

(51) Int. Cl.
*H04W 72/12* (2009.01)
*H04W 74/00* (2009.01)

(52) U.S. Cl.
USPC ........... 370/236; 370/329; 370/348; 370/349; 370/418; 370/444

(58) Field of Classification Search
USPC .............. 370/328, 329, 230.1, 235, 236, 346, 370/347, 348, 349, 345, 412, 414, 417, 418, 370/444, 445, 461, 462
See application file for complete search history.

(56) References Cited

U.S. PATENT DOCUMENTS

| | | | | |
|---|---|---|---|---|
| 4,819,229 A | * | 4/1989 | Pritty et al. | 370/455 |
| 7,474,642 B1 | * | 1/2009 | Chheda | 370/329 |
| 7,826,438 B1 | * | 11/2010 | Salhotra et al. | 370/345 |
| 7,990,872 B2 | * | 8/2011 | Ahn | 370/236 |
| 8,279,822 B2 | * | 10/2012 | Shihab | 370/329 |
| 2006/0140186 A1 | * | 6/2006 | LoGalbo et al. | 370/390 |
| 2007/0140115 A1 | * | 6/2007 | Bienas et al. | 370/230 |
| 2009/0196306 A1 | * | 8/2009 | King et al. | 370/462 |
| 2010/0220593 A1 | * | 9/2010 | Fujiwara et al. | 370/235 |
| 2011/0267959 A1 | * | 11/2011 | Yi et al. | 370/241 |

FOREIGN PATENT DOCUMENTS

JP 2008-141228 A 6/2008
KR 1020060099463 A 9/2006

* cited by examiner

*Primary Examiner* — Ahmed Elallam

(57) ABSTRACT

Provided is a method and apparatus for transmitting a packet in a wireless communication system. A method for transmitting a packet by a packet transmission apparatus in a wireless communication system includes determining whether the packet is a response packet, and transmitting the packet with a higher channel access opportunity than another packet transmission apparatus of the wireless communication system, if the packet is a response packet. Accordingly, it is possible to solve the problem that the total system performance degrades because a packet transmission apparatus fails to fully use its own transmission time by failing to rapidly receive a response packet even when packets remain to be transmitted in a wireless communication system using a contention-based channel access scheme.

12 Claims, 3 Drawing Sheets

METHOD AND APPARATUS FOR TRANSMITTING PACKET IN WIRELESS COMMUNICATION SYSTEM

CROSS-REFERENCES TO RELATED APPLICATIONS

The present application claims priority of Korean Patent Application Nos. 10-2009-0125490 and 10-2010-0128264, filed on Dec. 16, 2009 and Dec. 15, 2010, respectively, which are incorporated herein by reference in their entirety.

BACKGROUND OF THE INVENTION

1. Field of the Invention

Exemplary embodiments of the present invention relate to wireless communication systems; and, more particularly, to a method and apparatus for transmitting packets in a wireless communication system.

2. Description of Related Art

Referring to FIG. 1, a wireless communication system includes a base station 100 that communicates with one or more mobile stations 110-1, . . . , 110-$n$. For example, in a CDMA (Code Division Multiple Access) system, a base station communicates with one or more mobile terminals. In an IEEE 802.11 wireless LAN system, an access point (AP) communicates with one or more mobile stations.

In this structure, the base station and the mobile terminals transmit packets by accessing a channel through a contention for channel occupancy. What is at issue a scheme for improving the total system performance in transmitting packets in such a contention-based wireless communication system.

SUMMARY OF THE INVENTION

An embodiment of the present invention is directed to a method and apparatus for transmitting packets in a wireless communication system, which can solve the problem that the total system performance degrades because a packet transmission apparatus fails to fully use its own transmission time by failing to rapidly receive a response packet even when packets remain to be transmitted in a wireless communication system using a contention-based channel access scheme.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an embodiment of the present invention, a method for transmitting a packet by a packet transmission apparatus in a wireless communication system includes: determining whether the packet is a response packet; and transmitting the packet with a higher channel access opportunity than another packet transmission apparatus of the wireless communication system, if the packet is a response packet.

In accordance with another embodiment of the present invention, an apparatus for transmitting a packet in a wireless communication system includes: a packet classifying unit configured to determine whether the packet is a response packet; a transmission unit configured to transmit the packet; and a control unit configured to control the transmission unit to transmit the packet with a higher channel access opportunity than another packet transmission apparatus of the wireless communication system, if the packet is a response packet.

DESCRIPTION OF SPECIFIC EMBODIMENTS

Figure 1:
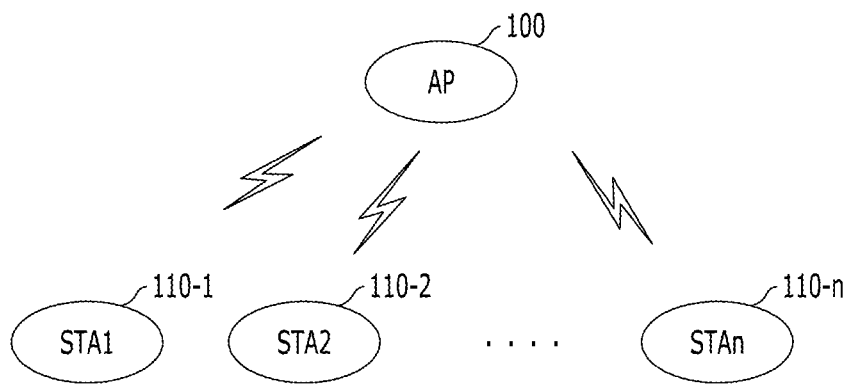
FIG. 1 is a diagram illustrating a structure of a wireless communication system.

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. In the following description, detailed descriptions of well-known functions or configurations will be omitted since they would unnecessarily obscure the subject matters of the present invention. Throughout the disclosure, like reference numerals refer to like parts throughout the various figures and embodiments of the present invention.

FIG. 1 is a diagram illustrating a structure of a wireless communication system.

Referring to FIG. 1, a wireless communication system includes a bases station (or an access point) 100 and one or more mobile terminal (or stations) 110-1, . . . , 110-$n$. Hereinafter, the terms of IEEE 802.11 wireless LAN are used to describe the present invention. However, the present invention is not limited by the terms such as an access point and a station.

In a wireless communication system, an access point and one or more stations contend for channel occupancy prior to transmission of packets. For example, the IEEE 802.11 wireless LAN standards specify a random backoff scheme. The random backoff scheme generates a random slot time value within a predetermined range (e.g., a contention window) before channel occupancy for packet transmission, and starts packet transmission if the channel is idle for the slot time.

In such a contention-based channel access scheme, each station and an access point transmit packets with the same probability because they use the same contention window value. The station or the access point, which has started transmission, may vary a transmission rate according to transmission channel conditions. If the channel condition is poor (an error probability is high), it transmits a packet at a low data rate; and if the channel condition is good, it transmits a packet at a high data rate. The reason for this is that a modulation scheme for a low data rate requires a low SNR (Signal to Noise Ratio) and a modulation scheme for a high data rate requires a high SNR.

When all stations and an access point use a channel in a fair manner, if the stations and the access point have different data rates, the total performance may degrade.

For example, when the station STA1 has a data rate of 1 Mbps and the station STA2 has a data rate of 11 Mbps, if the two stations transmit packets of 11 mega bits in an alternating manner (i.e., access the channel with a 50% probability), the station STA1 transmits for 11 seconds and the station STA2 transmits for 1 second. That is, the stations STA1 and STA2 have the same channel access opportunity, but the channel occupancy time varies according to the data rate. In the system, the total packet data rate of the system is 22 mega bits per 12 seconds and the total system performance is about 1.8 Mbps. The phenomenon that the performance of a station with a high data rate degrades due to a station with a low data rate is called a performance anomaly.

If a packet transmission time per each station's opportunity for transmission is equalized, the total system performance can be greatly improved. For example, if the station STA1 transmits for 11 seconds and the station STA2 transmits for 11 seconds, because the station STA1 transmits 1 packet per transmission and the station STA2 transmits 11 packets per transmission, the total packet data rate of the system is 132 (=11×1+11×11) mega bits per 22 seconds. This corresponds to about 6 Mbps that is about 3.3 times higher than 1.8 Mbps.

In order to utilize the advantage of such a performance improvement, IEEE 802.11e has introduced the concept of TXOP (Transmit Opportunity). Because a station (or an access point) occupying a channel can continuously transmit packets for a TXOP time without contention, a station with a higher data rate can transmit more packets.

The problem is that an upper layer can transmit a next packet only after receiving a specific packet from a destination after transmission of a packet.

An example of such a transmission scheme is TCP/IP that is most widely used in transport layers. In order to secure the reliability of packets, a TCP protocol transmits a next packet after detecting that a transmitted packet has successfully reached a destination. For example, the next packet is transmitted after receiving a response packet (ACK) for the transmitted packet from the destination. Thus, if a response packet is not received, even when there is a packet to be transmitted, the packet is not transmitted to a lower layer.

A UDP protocol transmits a next packet even when there is no response to a transmitted packet, which does not correspond to the above transmission scheme. However, even when a transport layer uses a UDP protocol, an application layer (i.e., an upper layer) may use the above transmission scheme. An example of this case is a traffic measurement utility program (e.g., IX Chariot). When an application stage generates a packet, the traffic measurement utility program generates and transmits a packet only when receiving a packet transmission request packet. That is, it follows the above transmission scheme that transmits a next packet only when receiving a specific packet from the destination.

However, if such a transmission scheme is used, a station may fail to fully use its own TXOP time when getting a packet transmission opportunity by occupying a wireless channel. If the station fails to fully use its own TXOP time, a performance anomaly occurs, thus causing a performance degradation. The reason for failing to fully use the TXOP time is follows.

If there are many stations and all of the stations use a TCP protocol, each station transmits a next packet only after receiving a response packet (ACK) for a transmitted packet. Herein, because an access point and a station have the same channel access opportunity, the access point cannot immediately transmit an ACK to the station. Thus, even when many packets remain to be transmitted, the station cannot transmit a next packet because it has not received an ACK. Therefore, the station fails to fully use its own TXOP time.

The present invention provides a response packet with a high priority, thereby solving a bottleneck problem caused the response packet delay. Accordingly, the station can maximally use its own TXOP time, thus improving the total system performance. That is, the present invention provides a packet transmission method and apparatus that can provide a high throughput, when using a transmission scheme that transmits a next packet from a transport layer or an application layer to a destination after receiving a response packet from the destination, in a wireless communication system in which an access point or one or more stations have the same TXOP.

Hereinafter, a description will be made in the context of the case where the access point transmits a response packet, when using a transmission scheme that transmits a next packet from the station after receiving a response packet from the access point, in a wireless communication system in which an access point or one or more stations have the same TXOP. However, the present invention is not limited thereto. The present invention may also be applicable to the case where the station transmits a response packet, when using a transmission scheme that transmits a next packet from the access point after receiving a response packet from station.

Figure 2:
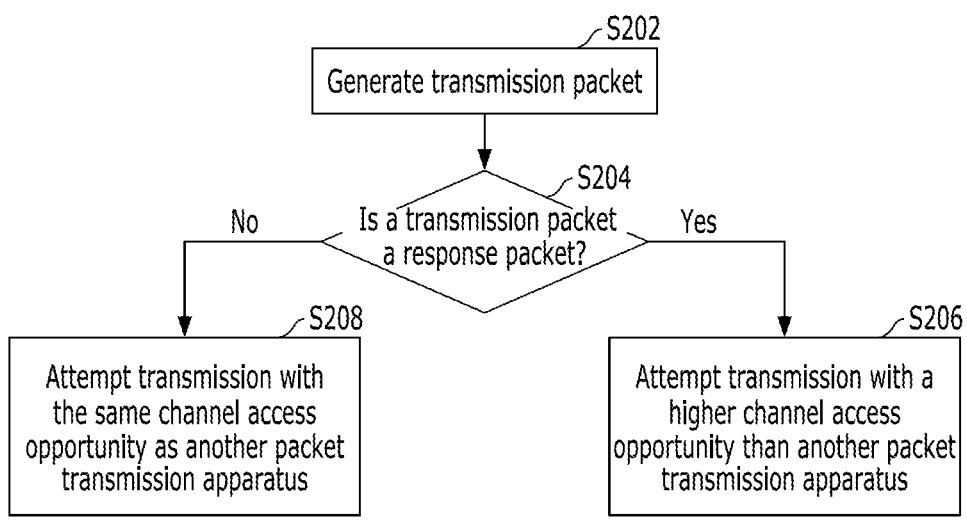
FIG. 2 is a flow diagram illustrating a packet transmission method in accordance with an exemplary embodiment of the present invention.

FIG. 2 is a flow diagram illustrating a packet transmission method in accordance with an exemplary embodiment of the present invention.

Referring to FIG. 2, in step S202, the access point 100 generates a transmission packet. Referring to FIG. 1, for example, the access point 100 may generate a packet to be transmitted to the first station 110-1. Herein, the access point 100 may receive a packet from a mobile terminal in another network or another station and may transmit a packet to be transmitted to the first station 110-1. Thus, the packet generated in the step S202 may be a new packet generated by the access point 100, may be a packet received from a mobile terminal in another network or another station, or may be a packet generated by adding/changing/deleting information necessary for the received packet.

In step S204, the access point 100 determines whether the transmission packet is a response packet. The response packet may be a packet for indicating a response to a packet transmitted from the station, or may be a packet for inducing the station to transmit a packet. For example, the response packet may be an ACK used in a TCP protocol, or may be a packet transmission request packet used in a traffic measurement utility program. In the step S204, whether the transmission packet is a response packet may be determined by the following methods.

In the first method, if information indicating whether the transmission packet is a response packet (hereinafter referred to as response packet indication information) is included in the transmission packet to be transmitted to the first station 110-1, the access point 100 may use the response packet indication information to determine whether the corresponding packet is a response packet. The response packet indication information may be included by the access point 100 in the step S202, or may be included by a mobile terminal in another network or another station that is to transmit a packet through the access point 100 to the first station 110-1.

In an exemplary embodiment, the response packet indication information may be included in a specific field of a header of a packet according to each protocol. In this case, the access point 100 may determine whether the corresponding packet is a response packet, by using the response packet indication information included in a specific field of a header of a packet according to each protocol. For example, if the value of a TYPE field in a header of an IP packet is 'ACK', the corresponding packet is determined to be a response packet.

In another exemplary embodiment, the response packet indication information may be included in an unused field (e.g., a reserved field) of a packet. Herein, a table storing packet classification standards may be used to indicate the response packet indication information in an unused field of a packet. For example, a table storing information, which indicates a response packet if a value is present in a field of a header of a packet according to each protocol, may be used to indicate the response packet indication information in an unused field of a packet. In this case, the access point 100 may determine whether the corresponding packet is a response packet, by using the response packet indication information included in an unused field of a packet.

In the second method, the access point 100 detects a source and a destination of a transmitted/received packet, regards the source and the destination as one pair, and manages history information about each pair. Also, it analyzes history information about the number (X) of packets consecutively transmitted from a source to a destination and history information about the number (Y) of packets consecutively transmitted from the destination to the source. If Y packets are transmitted in the opposite direction with respect to every X packets, Y packets transmitted after the next X packets may be determined to be response packets. For example, if 10 packets are transmitted from IP 192.168.0.1 (hereinafter referred to as 'A') to IP 192.168.0.100 (hereinafter referred to as 'B') and one packet are transmitted from B to A with respect to every 10 packets transmitted from A to B, one packet transmitted from B to A after next 10 packets transmitted from A to B may be classified as a response packet.

If the transmission packet is a response packet (Yes in S204), the access point 100 attempts transmission with a higher channel access opportunity than another station (S206). Herein, if a channel is idle, a packet is transmitted. If the station transmits a response packet, the station may attempt transmission with a higher channel access opportunity than the access point 100 and another station. In the step S206, the channel access opportunity may be controlled by the following method.

First, IEEE 802.11 MAC (Media Access Control) may use a contention window value to control the channel access opportunity. A random backoff process used in IEEE 802.11 generates a random value between 0 and a contention window value and attempts transmission after waiting for a time period corresponding to the random value. Herein, the access point 100 and all stations attempt transmission with the same probability because they use the same contention window value. Thus, if the contention window value is decreased, the probability of the random value being small is increased. Therefore, the average wait time is decreased, thus providing more transmission opportunities. Therefore, the access point 100 may attempt transmission by using a lower contention window value than another station.

If other MAC is used instead of IEEE 802.11 MAC, the corresponding MAC may detect and control parameters increasing the channel access probability. If the MAC protocol used in the system is understood, it can be intuitively known whether the channel access opportunity is increased when a parameter is controlled. Therefore, the access point 100 may control such a parameter to attempt transmission.

If the transmission packet is not a response packet (No in S204), the access point 100 attempts transmission with the same channel access opportunity as another station (S208). Herein, if a channel is idle, a packet is transmitted. If the station transmits a response packet, the station may attempt transmission with the same channel access opportunity as the access point 100 and another station.

Figure 3:
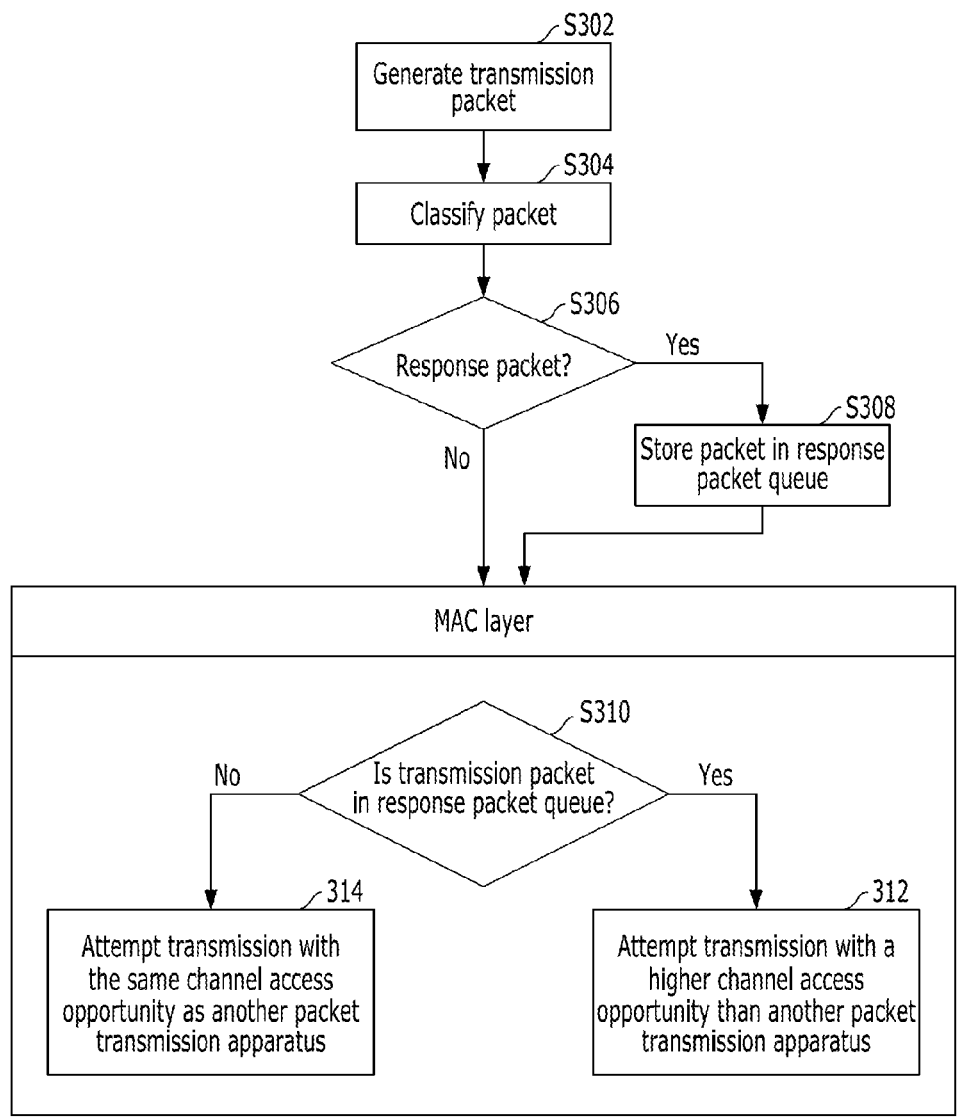
FIG. 3 is a flow diagram illustrating a packet transmission method in accordance with another exemplary embodiment of the present invention.

FIG. 3 is a flow diagram illustrating a packet transmission method in accordance with another exemplary embodiment of the present invention. Herein, a description of an overlap with FIG. 2 will be omitted for conciseness.

Referring to FIG. 3, in step S302, the access point 100 generates a transmission packet. This is the same as the step S202.

The access point 100 classifies a packet (S304) and determines whether the transmission packet is a response packet (S306). This is the same as the step S204.

If the transmission packet is a response packet (Yes in S306), the access point 100 stores the transmission packet in a queue (hereinafter referred to as a response packet queue) (S308).

Thereafter, the access point 100 determines whether the transmission packet is present in the response packet queue (S310). If the transmission packet is present in the response packet queue (Yes in S310), the access point 100 attempts to transmit the packet present in the response packet queue, with a higher channel access opportunity than another station (S312). This is the same as the step S206. If the transmission packet is not present in the response packet queue (No in S310), the access point 100 attempts transmission with the same channel access opportunity as another station (S314). This is the same as the step S208.

In an exemplary embodiment, the steps S302, S304, S306 and S308 may be performed in a layer higher than a MAC layer, and the steps S310, S312 and S314 may be performed in the MAC layer. Examples of the layer higher than the MAC layer include an application layer, a transport layer, and a network layer.

If the access point and one or more stations use a TCP protocol in a transport layer and use IEEE 802.11 MAC in a MAC layer, an exemplary embodiment of FIG. 3 is described below. First, it is assumed that 10 stations 110-1, 110-2, . . . , 110-10 have packets to be transmitted to the access point 100. Any one of the stations 110-1 to 110-10 transmits a packet by a random backoff process defined in IEEE 802.11. In a channel access scheme based on the random backoff process, because all the stations access a channel with the same probability, each of the stations transmits one or more packet after a predetermined time period. Because all the stations use TCP in a transport layer, the access point 100 transmits an ACK in response to the packet transmitted by each of the stations. By a packet classification process of the present invention, the access point 100 classifies the ACK as a response packet and stores the same in the response packet queue. Thereafter, the access point 100 attempts to transmit the ACK stored in the response packet queue, with a high channel access opportunity.

Figure 4:
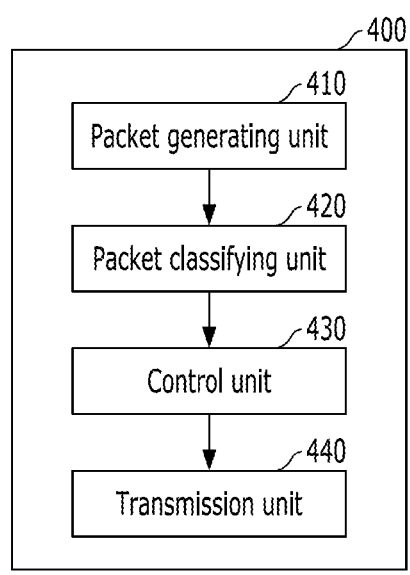
FIG. 4 is a block diagram of a packet transmission apparatus in accordance with an exemplary embodiment of the present invention.

FIG. 4 is a block diagram of a packet transmission apparatus 400 in accordance with an exemplary embodiment of the present invention. The packet transmission apparatus may be an apparatus that transmits a packet in a wireless communication system. For example, the packet transmission apparatus may be an access point or a station. Herein, a description of an overlap with FIGS. 2 and 3 will be omitted for conciseness.

Referring to FIG. 4, the packet transmission apparatus 400 may include a packet classifying unit 420, a control unit 430, and a transmission unit 440.

The packet classifying unit 420 determines whether the transmission packet is a response packet. This is the same as the step S204. As described with reference to FIG. 3, if the transmission packet is a response packet, the packet classifying unit 420 may store the transmission packet in the response packet queue.

The transmission unit 440 transmits the transmission packet over a channel.

The control unit 430 controls the transmission unit 440 to attempt transmission with a higher channel access opportunity than another station if the transmission packet is a response packet, and controls the transmission unit 440 to attempt transmission with the same channel access opportunity as another station if the transmission packet is not a response packet. This is the same as the steps S206, S208, S310, S312 and S314.

The packet transmission apparatus 400 may further include a packet generating unit 410. The packet generating unit 410 generates a transmission packet. This is the same as the step S202.

As described above, the present invention can solve the problem that the total system performance degrades because a packet transmission apparatus fails to fully use its own transmission time by failing to rapidly receive a response packet even when packets remain to be transmitted in a wireless communication system using a contention-based channel access scheme.

While the present invention has been described with respect to the specific embodiments, it will be apparent to those skilled in the art that various changes and modifications may be made without departing from the spirit and scope of the invention as defined in the following claims.

What is claimed is:

1. A method for transmitting a packet by a packet transmission apparatus in a wireless communication system, the method comprising:
    determining whether the packet is a response packet; and
    transmitting the packet with a higher channel access opportunity than another packet transmission apparatus of the wireless communication system if the packet is the response packet,
    wherein, in said determining whether the packet is a response packet,
    the history of a first number of packets consecutively transmitted from a source to a destination and the history of a second number of packets consecutively transmitted from the destination to the source are analyzed to determine the second number of packets to be response packets, the second number of packets being consecutively transmitted from the destination to the source after the first number of packets are consecutively transmitted from the source to the destination.

2. The method of claim 1, wherein if the packet is not the response packet, the packet transmission apparatus transmits the packet with the same channel access opportunity as the another packet transmission apparatus of the wireless communication system.

3. The method of claim 2, wherein, in said transmitting the packet with the same channel access opportunity as the another packet transmission apparatus of the wireless communication system,
    the packet is transmitted using the same contention window value as the another packet transmission apparatus of the wireless communication system.

4. The method of claim 1, wherein the packet includes a field for indicating whether the packet is the response packet, and
    said determining whether the packet is a response packet is performed on the basis of the field included in the packet.

5. The method of claim 1, further comprising:
    storing the packet in a queue if the packet is the response packet,
    wherein said transmitting the packet with a higher channel access opportunity than another packet transmission apparatus of the wireless communication system is performed if the packet is present in the queue.

6. The method of claim 1, wherein, in said transmitting the packet with a higher channel access opportunity than another packet transmission apparatus of the wireless communication system,
    the packet is transmitted using a lower contention window value than the another packet transmission apparatus of the wireless communication system.

7. An apparatus for transmitting a packet in a wireless communication system, the apparatus comprising:
    a packet classifying unit configured to determine whether the packet is a response packet;
    a transmission unit configured to transmit the packet; and
    a control unit configured to control the transmission unit to transmit the packet with a higher channel access opportunity than another packet transmission apparatus of the wireless communication system; if the packet is the response packet,
    wherein the packet classifying unit is configured to analyze the history of a first number of packets consecutively transmitted from a source to a destination and the history of a second number of packets consecutively transmitted from the destination to the source and determine the second number of packets to be response packets, the second number of packets being consecutively transmitted from the destination to the source after the first number of packets are consecutively transmitted from the source to the destination.

8. The apparatus of claim 7, wherein if the packet is not the response packet, the control unit is configured to transmit the packet with the same channel access opportunity as the another packet transmission apparatus of the wireless communication system.

9. The apparatus of claim 8, wherein if the packet is not the response packet, the control unit is configured to control the transmission unit to transmit the packet by using the same contention window value as the another packet transmission apparatus of the wireless communication system.

10. The apparatus of claim 7, wherein the packet includes a field for indicating whether the packet is the response packet, and
    the packet classifying unit is configured to determine whether the packet is the response packet on the basis of the field included in the packet.

11. The apparatus of claim 7, wherein the packet classifying unit is configured to store the packet in a queue if the packet is the response packet, and
    the control unit is configured to transmit the packet with a higher channel access opportunity than the another packet transmission apparatus of the wireless communication system if the packet is present in the queue.

12. The apparatus of claim 7, wherein if the packet is a the response packet, the control unit is configured to control the transmission unit to transmit the packet by using a lower contention window value than the another packet transmission apparatus of the wireless communication system.

* * * * *